(12) United States Patent
Deng

(10) Patent No.: US 11,791,859 B1
(45) Date of Patent: Oct. 17, 2023

(54) WATERPROOF HANDHELD DEVICE

(71) Applicant: SHENZHEN YISE TECHNOLOGY CO., LTD, Shenzhen (CN)

(72) Inventor: Li Xin Deng, Shenzhen (CN)

(73) Assignee: SHENZHEN YISE TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 17/964,050

(22) Filed: Oct. 12, 2022

(30) Foreign Application Priority Data

Aug. 11, 2022 (CN) .......................... 202210963491.4

(51) Int. Cl.
*H04B 1/3888* (2015.01)
*H04M 1/12* (2006.01)

(52) U.S. Cl.
CPC ............ *H04B 1/3888* (2013.01); *H04M 1/12* (2013.01)

(58) Field of Classification Search
CPC ................................ H04B 1/3888; H04M 1/12
See application file for complete search history.

(56) References Cited

U.S. PATENT DOCUMENTS

| 9,001,511 | B2 * | 4/2015 | Gobeil | G06F 1/1626 |
| | | | | 248/316.4 |
| 9,332,170 | B1 * | 5/2016 | Khalili | F16M 11/10 |
| 9,386,832 | B2 * | 7/2016 | Elgan | A45C 11/00 |
| 9,473,608 | B1 * | 10/2016 | Sherman | F16M 11/38 |
| D780,247 | S * | 2/2017 | Anari, III | D16/242 |
| 9,706,172 | B1 * | 7/2017 | Hillman | H04N 7/18 |
| 10,384,745 | B1 * | 8/2019 | Vallabh | B62B 15/006 |
| 2007/0053680 | A1 * | 3/2007 | Fromm | G03B 17/561 |
| | | | | 396/420 |
| 2013/0225248 | A1 * | 8/2013 | Takagi | H04M 1/021 |
| | | | | 455/575.3 |
| 2015/0248049 | A1 * | 9/2015 | Putbrese | F16M 11/28 |
| | | | | 396/25 |
| 2016/0077410 | A1 * | 3/2016 | Lytle | H04N 23/661 |
| | | | | 248/371 |
| 2016/0223886 | A1 * | 8/2016 | Bellerive | G03B 17/563 |
| 2016/0309080 | A1 * | 10/2016 | Chu | G06V 40/161 |
| 2017/0009802 | A1 * | 1/2017 | Uke | G03B 17/563 |
| 2017/0055698 | A1 * | 3/2017 | Jose | F16B 7/105 |
| 2017/0251793 | A1 * | 9/2017 | Barratt | F16M 11/28 |

(Continued)

FOREIGN PATENT DOCUMENTS

GB          2578637 A    *  5/2020  ............. F16M 11/24

*Primary Examiner* — Lewis G West

(57) ABSTRACT

A waterproof handheld device includes a handle including a control module and a telescopic rod including tubes. The tubes include a first tube connected with a waterproof case configured to receive a terminal device. The first tube is an outermost tube or an innermost tube. When the first tube is the innermost tube, the outermost tube is connected with the handle. When the first tube is the outermost tube, the innermost tube is connected with the handle. The first tube is connected with a first wireless communication module. The first wireless communication module is connected with the control module through a communication wire arranged in the telescopic rod. The first wireless communication module is communicated with a second wireless communication module connected with the terminal device or the first wireless communication module is communicated with a third wireless communication module of the terminal device.

8 Claims, 4 Drawing Sheets

(56) References Cited

U.S. PATENT DOCUMENTS

| | | | | |
|---|---|---|---|---|
| 2017/0277021 | A1* | 9/2017 | Sultan | A63C 1/42 |
| 2017/0318210 | A1* | 11/2017 | Harada | G03B 17/08 |
| 2018/0088445 | A1* | 3/2018 | Michaud | G03B 17/563 |
| 2018/0141491 | A1* | 5/2018 | Kim | B60Q 1/2661 |
| 2019/0047467 | A1* | 2/2019 | Kim | F16M 13/00 |
| 2019/0075922 | A1* | 3/2019 | Rivera | A46B 15/0042 |
| 2019/0162359 | A1* | 5/2019 | Kundu | F16M 13/04 |
| 2019/0258142 | A1* | 8/2019 | Liu | H05K 1/18 |
| 2020/0011728 | A1* | 1/2020 | Ganahl | G01G 19/18 |
| 2020/0149679 | A1* | 5/2020 | Grabner | F16M 11/16 |
| 2021/0022463 | A1* | 1/2021 | Newcombe | A45B 3/00 |
| 2021/0164610 | A1* | 6/2021 | Roth | A45F 5/02 |
| 2021/0181610 | A1* | 6/2021 | Guo | H04N 23/54 |
| 2021/0400175 | A1* | 12/2021 | Dunn | F16M 11/16 |
| 2022/0128887 | A1* | 4/2022 | Koseki | G05D 5/00 |

\* cited by examiner

WATERPROOF HANDHELD DEVICE

TECHNICAL FIELD

The present disclosure relates to a technical field of diving devices, and in particular, to a waterproof handheld device.

BACKGROUND

Diving is a globally loved activity. In order to improve diving experience and record wonderful moments, many divers bring their own terminal device into the water for recording when diving. The terminal device is generally not waterproof when the terminal device is underwater, so it is necessary to provide a waterproof case to receive the terminal device and prevent the terminal device from entering water. Divers are able to bring the terminal device with the waterproof case underwater to realize photography. However, the divers need to hold the terminal device in their hands and cannot let go, so the terminal device is not conducive to be used for long-distance selfies or be used in some special scenarios SUMMARY In view of defects mentioned above, it is necessary to provide a waterproof handheld device that allows a terminal device to be kept at a certain distance from a hand of a driver during diving and enables the terminal device to be controlled underwater.

The present disclosure provides a waterproof handheld device. The waterproof handheld device comprises a handle and a telescopic rod.

A control module is arranged on the handle. The telescopic rod comprises tubes sleeved one by one.

The tubes comprise a first tube configured to connect with a waterproof case. The first tube is an outermost tube of the tubes or the first tube is an innermost tube of the tubes. When the first tube is the innermost tube, the outermost tube is connected with the handle. When the first tube is the outermost tube, the innermost tube is connected with the handle. The first tube is connected with a first wireless communication module.

The waterproof case is configured to receive a terminal device; the first wireless communication module is sealed. The first wireless communication module is connected with the control module through a communication wire. The first wireless communication module is wirelessly communicated with a second wireless communication module arranged on the waterproof case or the first wireless communication module is wirelessly communicated with a third wireless communication module of the terminal device. When the first wireless communication module is wirelessly communicated with the second wireless communication module, the second wireless communication module is communicated with the terminal device.

The present disclosure provides a waterproof handheld device. The waterproof handheld device comprises a handle, a telescopic rod, and a waterproof case. A control module is arranged on the handle. The waterproof case is configured to receive a terminal device. The telescopic rod comprises tubes sleeved one by one.

The tubes comprise a first tube connected with the waterproof case. The first tube is an outermost tube of the tubes or the first tube is an innermost tube of the tubes. When the first tube is the innermost tube, the outermost tube is connected with the handle. When the first tube is the outermost tube, the innermost tube is connected with the handle. The first tube is connected with a first wireless communication module.

Compared with the prior art, the present disclosure provides the waterproof handheld device. The control module is arranged on the handle. The first tube configured to connect with the waterproof case is connected with the first wireless communication module. The first communication module is connected with the control module through the communication wire arranged in the telescopic rod. Control signals sent by the control module is wirelessly received by the second wireless communication module through the first wireless communication module, so the terminal device is controlled. Alternatively, the control signals sent by the control module is wirelessly received by the third wireless communication module and the terminal device is controlled by the control signals. Therefore, the driver is able to keep the terminal device at a certain distance from the hand and controls the terminal device underwater during diving.

DETAILED DESCRIPTION

Figure 1:
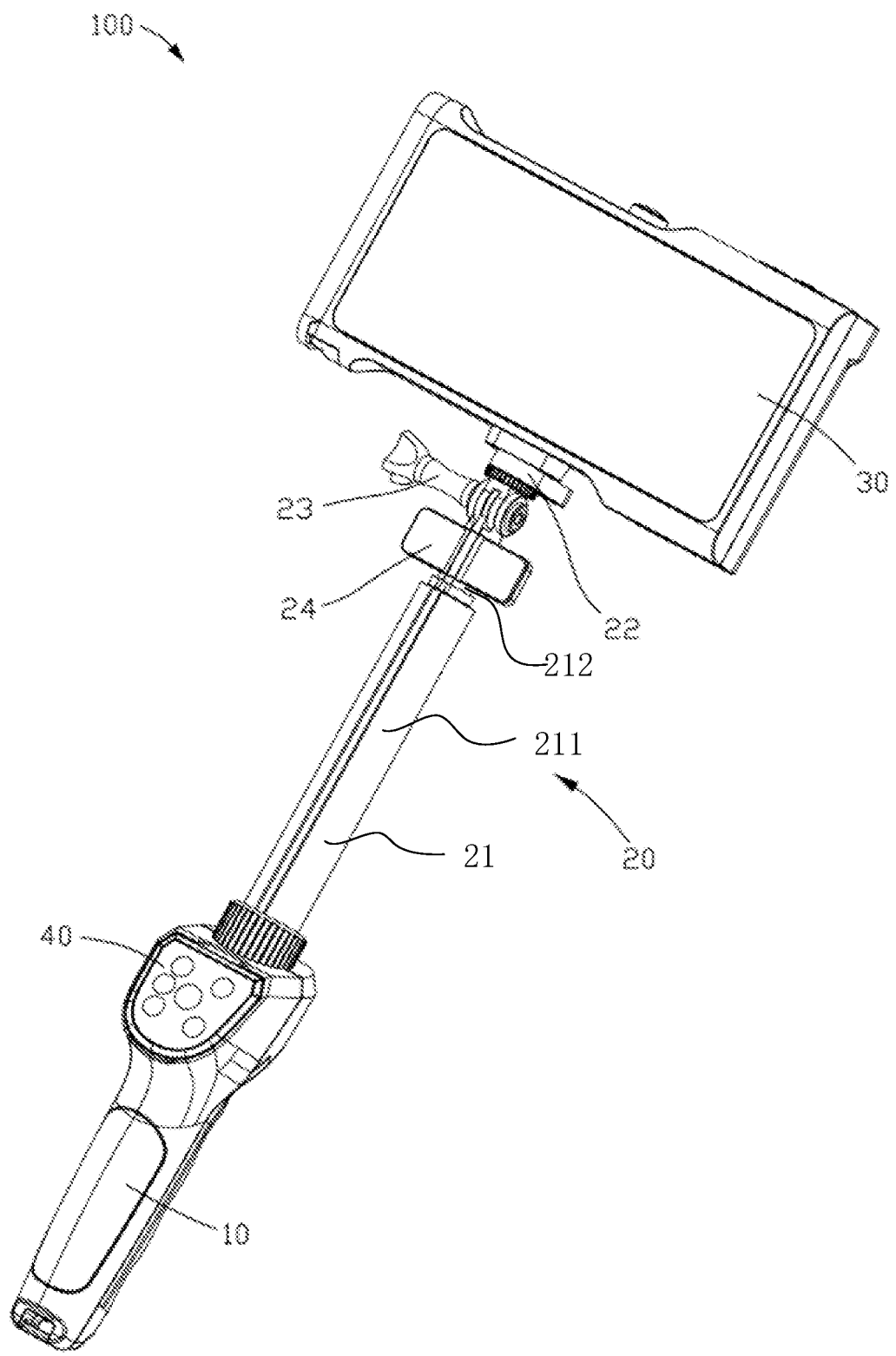
FIG. 1 is a schematic diagram of a waterproof handheld device of the present disclosure where a waterproof case is assembled.
Figure 2:
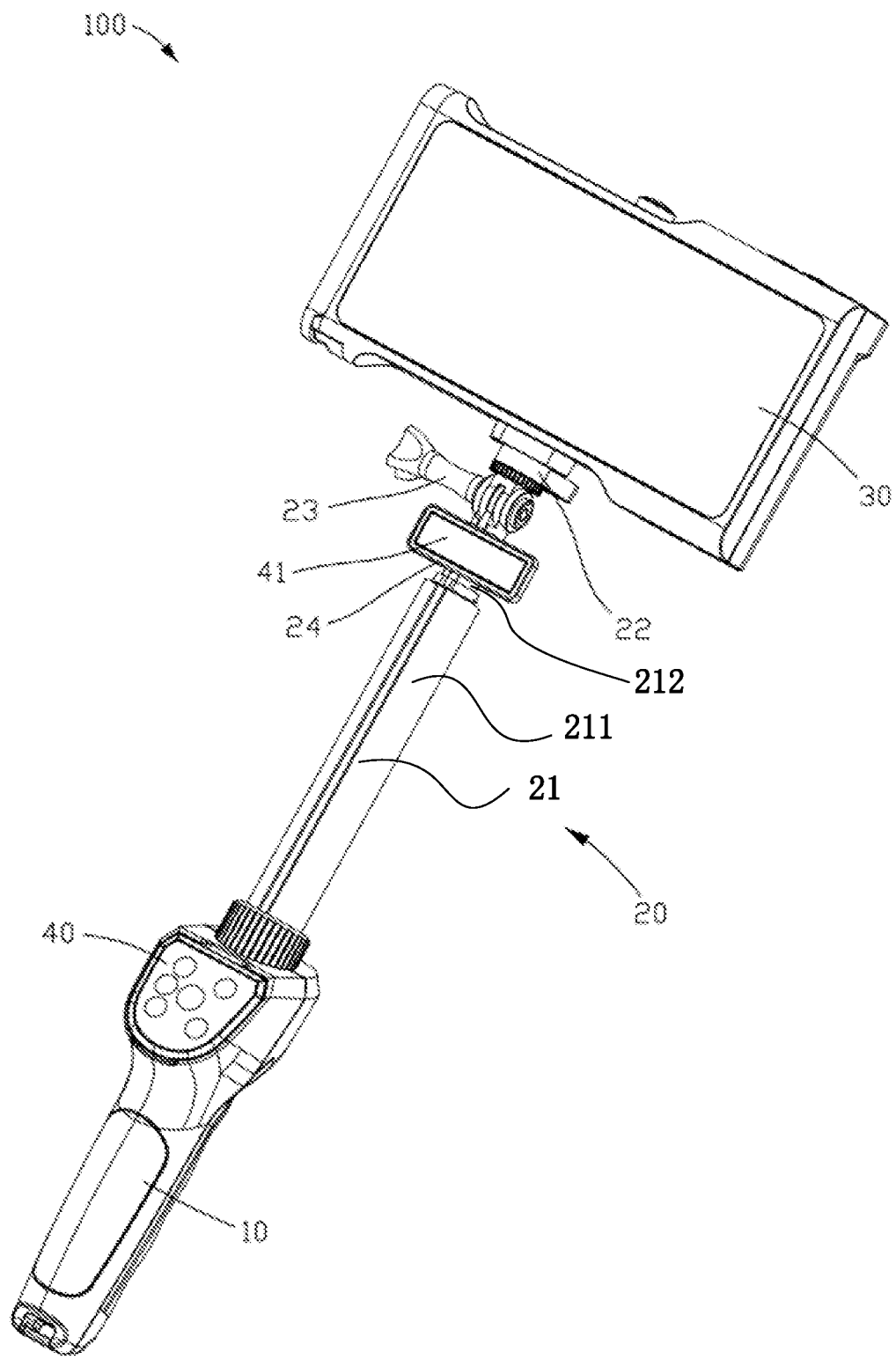
FIG. 2 is a schematic diagram of the waterproof handheld device of the present disclosure where a box is removed.
Figure 3:
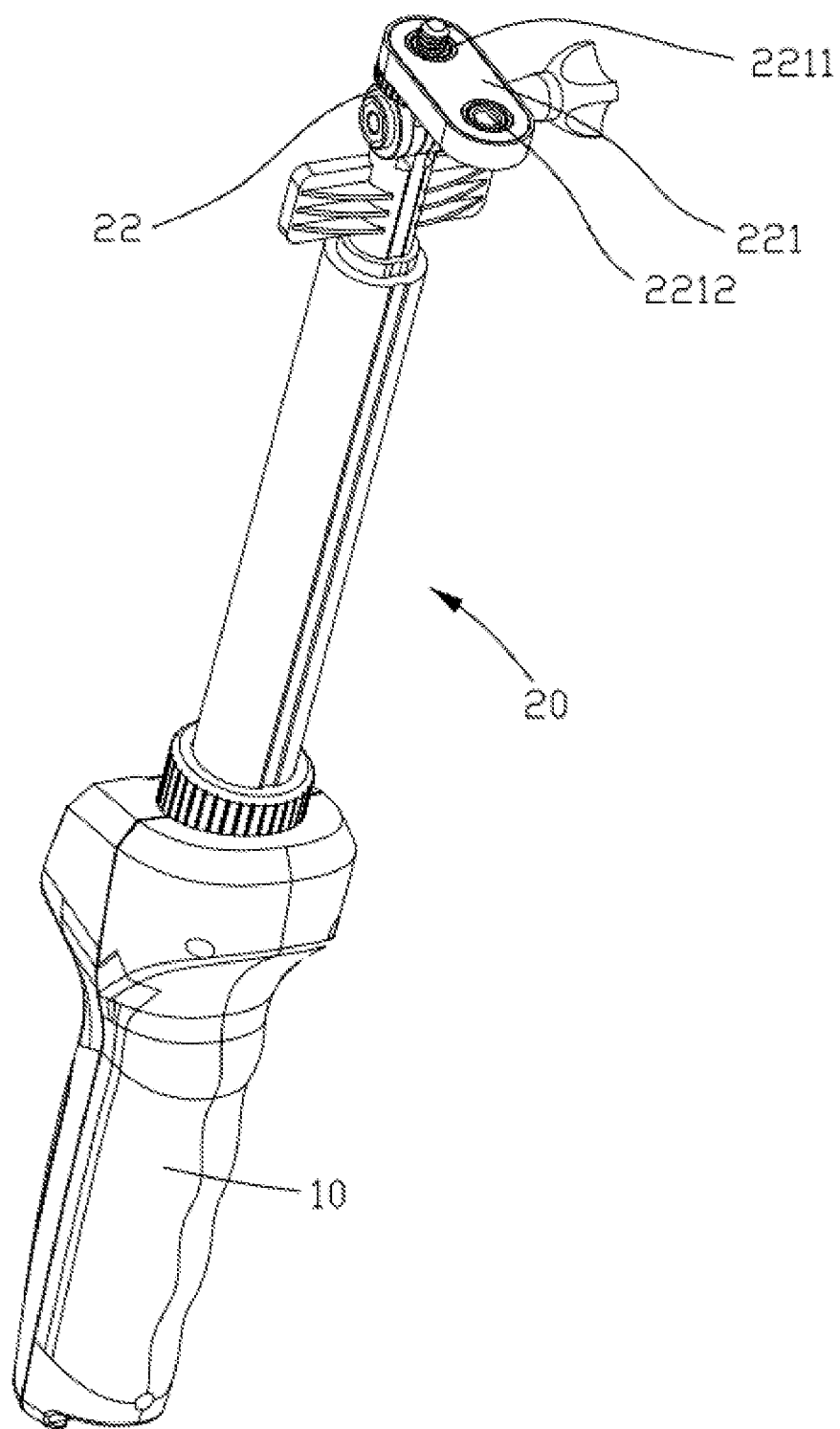
FIG. 3 is a schematic diagram of the waterproof handheld device of the present disclosure where the waterproof case is removed.
Figure 4:
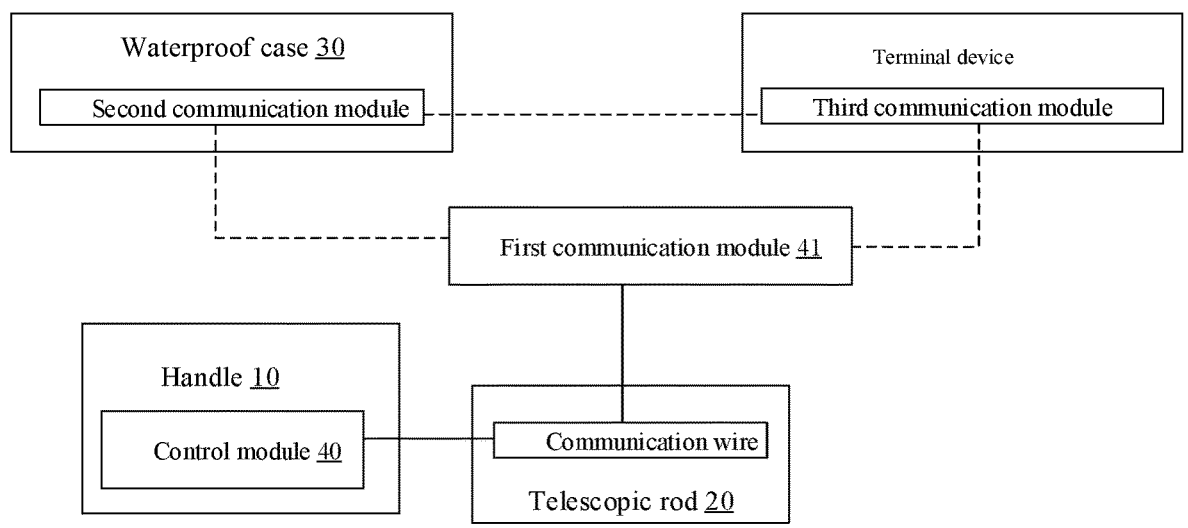
FIG. 4 is a schematic diagram showing a communication principle of the waterproof handheld device of the present disclosure.

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure. It is understood that the drawings are only provided for reference and illustration, and are not used to limit the present disclosure. The connection relationship shown in the drawings is only for the convenience of clear description, and does not intend to limit the connection mode.

It should be noted that when a component is considered to be "connected" to another component, it can be directly connected to another component, or there may be a centered component at the same time. Unless otherwise defined, all technical and scientific terms used herein have the same meaning as commonly understood by those skilled in the art of the present disclosure. It should be noted in the description of the present disclosure that, unless otherwise regulated and defined, terms such as "installation", "bonded", and "connection" shall be understood in broad sense, and for example, may refer to fixed connection or detachable connection or integral connection; may refer to mechanical connection or electrical connection; and may refer to direct connection or indirect connection through an intermediate medium or inner communication of two elements. For those of ordinary skill in the art, the meanings of the above terms in the present disclosure may be understood according to concrete conditions.

In addition, it should be noted that in the description of the present disclosure terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure. In addition, terms such as "first", "second", and "third" are only used for the purpose of description, rather than being understood to indicate or imply relative importance.

In one embodiment, the present disclosure provides a waterproof handheld device 100. The waterproof handheld device 100 comprises a handle 10 and a telescopic rod 20. The waterproof handheld device 100 further comprises a waterproof case 30. The waterproof case 30 is configured to receive a terminal device and prevents the terminal device from entering water. The terminal device is received in the waterproof case 30 and is not shown in the drawings.

The telescopic rod 20 comprises tubes 21 sleeved one by one. Each two adjacent tubes 21 of the tubes 21 is extendable and retractable with respect to each other. An outermost tube 211 of the tubes is connected to the handle 10 while an innermost tube 212 of the tubes 21 is configured to connect with the waterproof case 30 receiving the terminal device. A distance between the waterproof case 30 and the handle 10 is adjusted by pulling out or folding the telescopic rod 20, which changes a distance between the terminal device and the handle 10. Of course, in other embodiments, the innermost tube 212 is connected to the handle 10 and the outermost tube 211 is configured to connect with the waterproof case 30 receiving the terminal device.

The innermost tube 212 is connected with a mounting seat 22. The waterproof case 30 is mounted on the mounting seat 22. Specifically, the waterproof case 30 is detachably mounted on the mounting seat 22 through screws. The mounting seat 22 is hinged with the innermost tube 212, so the mounting seat 22 is rotatable with respect to the telescopic rod 20 to change an angle of the waterproof case 30. A tightness adjusting knob 23 is arranged on a hinge position of the innermost tube 212. A tightness of the hinge position is adjusted by rotating the tightness adjusting knob 23. Therefore, the mounting seat 22 is fixed or rotatable by rotating the tightness adjusting knob 23.

The mounting seat 22 comprises a mounting plate 221. The mounting plate 221 defines a first mounting hole 2211 and a second mounting hole 2212. The second mounting hole 2212 is closer to a rear side of the waterproof handheld device 100 than the first mounting hole 2211. After the waterproof case 30 is mounted in the first mounting hole 2211, the second mounting hole 2212 is adjacent to a rear side of the waterproof case 30. A fill light is mounted on the rear side of the waterproof case 30 through the second mounting hole 2212. After the fill light is mounted, the waterproof handheld device 100 is configured as a lighting device.

A control module 40 is arranged on the handle 10. The control module 40 is waterproof function. The control module 40 is embedded in grooves provided on the handle 10. The control module 40 may comprise a shooting control unit. The innermost tube 212 is connected with a first wireless communication module 41. The first wireless communication module 41 is sealed to prevent water from entering the first wireless communication module 41. Specifically, the innermost tube 212 comprises a box 24. The first wireless communication module 41 is sealed in the box 24. The first wireless communication module 41 is arranged on one end of the innermost tube 212 and is close to the waterproof case 30. The control module 40 is connected with the first wireless communication module 41 through a communication wire. The communication wire passes through the handle 10 and the telescopic rod 20 and is communicated with the first wireless communication module 41. Therefore, the communication wire is hid in the handle 10 and the telescopic rod 20.

The waterproof case 30 comprises a second wireless communication module (not shown in the drawings). The second wireless communication module is connected with the terminal device received in the waterproof case 30. The first wireless communication module 41 is wirelessly communicated with the second wireless communication module, thereby realizing a communication connection between the control module 40 and the terminal device and realizing control of the terminal device.

In one alternative embodiment, the first wireless communication module 41 is directly communicated with a third wireless communication module (not shown in the drawings) of the terminal device to realize the control of the terminal device. The first wireless communication module 41, the second wireless communication module, and the third wireless communication module are communicated through WIFI, ZigBee, LoRa, or the like.

When underwater, a wireless communication distance is greatly limited. When the wireless communication distance is long, communication between a conventional handheld device and the terminal device is blocked, leading to the terminal device being unable to respond or being unresponsive. In the present disclosure, the innermost tube 212 is closest to the waterproof case 30 and is connected to the first wireless communication module 41. The first wireless communication module 41 is close to the waterproof case 30. When the telescopic rod 20 is pulled out, the distance between the control module 40 and the waterproof case 30 increases, and a distance between the first wireless communication module 41 and the waterproof case 30 is not changed, Therefore, control signals sent by the control module 40 are stably transmitted to the terminal device through the first wireless communication module 41 to realize the control of the terminal device (for example, to realize shooting of the terminal device). Namely, a length of the telescopic rod 20 does not affect communication effects.

In the specification and claims of the present disclosure, terms "include/comprise" and terms "have/contain" and their variants are used to designate existence of stated features, values, steps or components, but do not exclude the existence or addition of one or multiple other features, values, steps, components, or combinations thereof.

For clarity of explanation, some features of the present disclosure are described in different embodiments. However, these features can also be combined and described in a single embodiment. Moreover, some features of the present disclosure are only described in a single embodiment for the sake of brevity. However, these features can also be described in different embodiments separately or in any suitable combination.

Foregoing descriptions are only optional embodiments of the present disclosure and are not intended to limit the present disclosure. Any modification, equivalent replacement, or improvement within the technical scope of the present disclosure should be included in the protection scope of the present disclosure.

What is claimed is:

1. A waterproof handheld device, comprising:
a handle; and
a telescopic rod;
wherein a control module is arranged on the handle; the telescopic rod comprises tubes sleeved one by one;
wherein the tubes comprise a first tube configured to connect with a waterproof case; the first tube is an outermost tube of the tubes or the first tube is an innermost tube of the tubes;
when the first tube is the innermost tube, the outermost tube is connected with the handle; when the first tube is the outermost tube, the innermost tube is connected with the handle; the first tube is connected with a first wireless communication module;
wherein the waterproof case is configured to receive a terminal device; the first wireless communication module is sealed; the first wireless communication module is connected with the control module through a communication wire; the first wireless communication module is wirelessly communicated with a second wireless communication module arranged on the waterproof case or the first wireless communication module is wirelessly communicated with a third wireless communication module of the terminal device; when the first wireless communication module is wirelessly communicated with the second wireless communication module, the second wireless communication module is communicated with the terminal device.

2. The waterproof handheld device according to claim 1, wherein the first tube connected with the waterproof case is connected with a mounting seat; the first tube is connected with the waterproof case through the mounting seat.

3. The waterproof handheld device according to claim 2, wherein the mounting seat comprises a first mounting hole and a second mounting hole; the second mounting hole is closer to a rear side of the waterproof handheld device than the first mounting hole; the first mounting hole is configured to mount the waterproof case; the second mounting hole is configured to mount a fill light arranged on a rear side of the waterproof case.

4. The waterproof handheld device according to claim 1, wherein the communication wire is arranged in the telescopic rod.

5. A waterproof handheld device; comprising:
a handle;
a telescopic rod; and
a waterproof case;
wherein a control module is arranged on the handle; the waterproof case is configured to receive a terminal device; the telescopic rod comprises tubes sleeved one by one;
wherein the tubes comprise a first tube connected with the waterproof case; the first tube is an outermost tube of the tubes or the first tube is an innermost tube of the tubes; when the first tube is the innermost tube, the outermost tube is connected with the handle; when the first tube is the outermost tube, the innermost tube is connected with the handle; the first tube is connected with a first wireless communication module;
wherein the first wireless communication module is sealed; the first wireless communication module is connected with the control module through a communication wire; the first wireless communication module is wirelessly communicated with a second wireless communication module arranged on the waterproof case or the first wireless communication module is wirelessly communicated with a third wireless communication module of the terminal device; when the first wireless communication module is wirelessly communicated with the second wireless communication module, the second wireless communication module is communicated with the terminal device;
wherein the first tube connected with the waterproof case comprises a box; the first wireless communication module is sealed in the box.

6. The waterproof handheld device according to claim 5, wherein the first tube connected with the waterproof case is connected with a mounting seat; the first tube is connected with the waterproof case through the mounting seat.

7. The waterproof handheld device according to claim 6, wherein the mounting seat comprises a first mounting hole and a second mounting hole; the second mounting hole is closer to a rear side of the waterproof handheld device than the first mounting hole; the first mounting hole is configured to mount the waterproof case; the second mounting hole is configured to mount a fill light arranged on a rear side of the waterproof case.

8. The waterproof handheld device according to claim 5, wherein the communication wire is arranged in the telescopic rod.

* * * * *